(12) United States Patent
Zhao et al.

(10) Patent No.: US 10,466,745 B2
(45) Date of Patent: Nov. 5, 2019

(54) OPERATIONAL CONTROL METHOD FOR FLEXIBLE DISPLAY DEVICE

(71) Applicants: KUNSHAN NEW FLAT PANEL DISPLAY TECHNOLOGY CENTER CO., LTD., Jiangsu (CN); KUNSHAN GO-VISIONOX OPTO-ELECTRONICS CO., LTD., Jiangsu (CN)

(72) Inventors: Jingxun Zhao, Kunshan (CN); Xiuqi Huang, Kunshan (CN); Sha Li, Kunshan (CN); Haiying Zhang, Kunshan (CN); Lei Xu, Kunshan (CN); Xinyu Qin, Kunshan (CN); Baoyou Wang, Kunshan (CN); Shuo Yang, Kunshan (CN); Xiangchao Liu, Kunshan (CN); Suhua Li, Kunshan (CN)

(73) Assignees: KUNSHAN NEW FLAT PANEL DISPLAY TECHNOLOGY CENTER CO., LTD., Jiangsu (CN); KUNSHAN GO-VISIONOX OPTO-ELECTRONICS CO., LTD., Jiangsu (CN)

(*) Notice: Subject to any disclaimer, the term of this patent is extended or adjusted under 35 U.S.C. 154(b) by 224 days.

(21) Appl. No.: 15/526,342

(22) PCT Filed: Nov. 12, 2015

(86) PCT No.: PCT/CN2015/094363
§ 371 (c)(1),
(2) Date: May 12, 2017

(87) PCT Pub. No.: WO2016/074625
PCT Pub. Date: May 19, 2016

(65) Prior Publication Data
US 2017/0322596 A1 Nov. 9, 2017

(30) Foreign Application Priority Data

Nov. 13, 2014 (CN) .......................... 2014 1 0641763
Nov. 20, 2014 (CN) .......................... 2014 1 0669341
(Continued)

(51) Int. Cl.
*G06F 1/16* (2006.01)
*G06F 3/041* (2006.01)
(Continued)

(52) U.S. Cl.
CPC .......... *G06F 1/1652* (2013.01); *G06F 1/1605* (2013.01); *G06F 3/01* (2013.01);
(Continued)

(58) Field of Classification Search
CPC ..................... G06F 1/1652; G06F 2203/04102
See application file for complete search history.

(56) References Cited

U.S. PATENT DOCUMENTS 8,502,788 B2   8/2013  Cho
8,982,106 B2   3/2015  Moriwaki
(Continued)

FOREIGN PATENT DOCUMENTS

CN   101739171   6/2010
CN   102097047   6/2011
(Continued)

OTHER PUBLICATIONS

Search Report & First Office Action for Priority Chinese Patent Application No. 201410669341.8, 4 pages.
(Continued)

*Primary Examiner* — Xuemei Zheng
(74) *Attorney, Agent, or Firm* — Seyfarth Shaw LLP

(57) ABSTRACT

An operational control method of a flexible display device for controlling the flexible display device is disclosed, and
(Continued)

the method includes: detecting an action performed by a user to the device, the action including one or any combination of bending, folding, edge deforming and shape recovering; and analyzing a characteristic value of the action, and performing a corresponding system function when the characteristic value of the action satisfies a preset condition.

23 Claims, 6 Drawing Sheets

(30) Foreign Application Priority Data

| Nov. 21, 2014 | (CN) | 2014 1 0676645 |
| Nov. 26, 2014 | (CN) | 2014 1 0693308 |

(51) Int. Cl.
*G06F 3/01* (2006.01)
*G06T 3/40* (2006.01)
*G06F 21/62* (2013.01)

(52) U.S. Cl.
CPC ............... *G06F 3/041* (2013.01); *G06T 3/40* (2013.01); *G06F 21/6218* (2013.01); *G06F 2200/1637* (2013.01); *G06F 2203/04102* (2013.01); *G06F 2203/04106* (2013.01)

(56) References Cited

U.S. PATENT DOCUMENTS

| 2013/0083496 | A1 | 4/2013 | Franklin et al. |
| 2013/0265262 | A1 | 10/2013 | Jung et al. |
| 2013/0296000 | A1 | 11/2013 | Park et al. |
| 2013/0307816 | A1* | 11/2013 | Lee ........................ G06F 1/1652 345/174 |
| 2014/0028596 | A1* | 1/2014 | Seo ........................ G06F 3/0487 345/173 |
| 2014/0028597 | A1 | 1/2014 | Cho et al. |
| 2014/0101560 | A1* | 4/2014 | Kwak .................... G06F 1/1652 715/738 |
| 2015/0253883 | A1 | 9/2015 | Takano et al. |
| 2015/0381929 | A1* | 12/2015 | Lee ...................... H04M 1/0202 348/14.03 |
| 2017/0075559 | A1* | 3/2017 | Jung ........................ G06F 3/14 |

FOREIGN PATENT DOCUMENTS

| CN | 103105897 | 5/2013 |
| CN | 103365568 | 10/2013 |
| CN | 103384284 | 11/2013 |
| CN | 103401974 | 11/2013 |
| CN | 103576979 A | 2/2014 |
| CN | 103827771 | 5/2014 |
| CN | 104662505 | 5/2015 |
| JP | 2010157060 | 7/2010 |
| JP | 2014067291 | 4/2014 |
| JP | 2014029690 | 2/2015 |
| KR | 1020140016075 | 2/2014 |
| TW | 200736591 | 1/2007 |
| TW | 200846990 | 1/2008 |
| TW | 201327268 | 1/2013 |
| TW | 201331823 | 1/2013 |
| TW | 201406120 | 1/2014 |
| TW | 201431445 | 1/2014 |
| WO | 2013073279 | 5/2013 |
| WO | 2014050411 | 3/2014 |
| WO | 2014107079 | 7/2014 |

OTHER PUBLICATIONS

Search Report & First Office Action for Priority Chinese Patent Application No. 201410693308.9, 4 pages.
Search Report & First Office Action for Priority Chinese Patent Application No. 201410676645.7, 4 pages.
First Office Action for the Prarellel Taiwan Patent Application No. 104137277 dated Jun. 14, 2016, 12 pages.
International Search Report, dated Jan. 8, 2016; 4 pages.
Written Opinion of International Search Authority, dated Jan. 4, 2016; 3 pages.
Search Report & First Office Action for Priority Chinese Patent Application No. 201410641763.4, dated Mar. 29, 2018, 9 pages.
First Office Action for the Parallel Japanese Patent Application No. 2017-525841, dated Feb. 20, 2018, 8 pages.
First Office Action for the Parallel Korean Patent Application No. 10-2017-7015976, dated May 11, 2018, 23 pages.
Extended European Search Report & First Office Action for European Patent Application No. 15858817.8, dated Jun. 6, 2018, 11 pages.

* cited by examiner

OPERATIONAL CONTROL METHOD FOR FLEXIBLE DISPLAY DEVICE

CROSS REFERENCE TO RELATED APPLICATIONS

This is a National Stage Application of PCT/CN2015/094363, filed Nov. 12, 2015, and claims priority to: (1) Chinese Patent Application Serial No. CN 201410641763.4, filed Nov. 13, 2014; (2) Chinese Patent Application Serial No. CN 201410669341.8, filed Nov. 20, 2014; (3) Chinese Patent Application Serial No. CN 201410676645.7, filed Nov. 21, 2014; and (4) Chinese Patent Application Serial No. CN 201410693308.9, filed Nov. 26, 2014, the disclosures of which are incorporated herein by reference.

FIELD

The present disclosure relates to the field of flexible display technology, and particularly to an operational control method of a flexible display device.

BACKGROUND

A flexible display device has many advantages, such as being convenient for carrying, being flexible, being able to be deformed freely, and so on. As the flexible display technology becomes more and more mature, the flexible screen will become common to our daily life, and the flexible mobile device will also gradually become a main tool in our daily life. The flexible mobile device will gradually replace traditional mobile devices, such as mobile phone or tablet computer in the near future. However, the flexible mobile device has some shortcomings at present, for example, it is not easy to perform operations on the flexible mobile device directly to cause the flexible mobile device execute instructions, such as enlarging an image, turning on or off the flexible mobile device, unlocking the flexible mobile device, or receiving and making calls.

In addition, the traditional bending detection to the display device is low in precision, and cannot locate a bent position accurately, and so it is difficult to perform various operations through bending actions.

SUMMARY

Based on the above, it is necessary to provide a method for controlling with the deformation characteristics of the flexible display device itself, and it is necessary to provide a method to accurately detect a position at which bending occurs.

According to an aspect of the present disclosure, an operational control method of a flexible display device for controlling the flexible display device is provided, and the method includes:

detecting an action performed by a user to the device, the action including one or any combination of bending, folding, edge deforming and shape recovering; and analyzing a characteristic value of the action, and performing a corresponding system function when the characteristic value of the action satisfies a preset condition.

In one embodiment, a first film layer and a second film layer are arranged on the flexible display device, the first film layer includes a plurality of first orientation sensing units arranged in parallel in a first direction, and the second film layer includes a plurality of second orientation sensing units arranged in parallel in a second direction;

each of the first and second orientation sensing units is adapted to generate a sensing signal when being bent; and the detecting the action performed by the user to the device includes:

acquiring the sensing signals from the first and second orientation sensing units; and determining a position at which bending occurs based on the sensing signals from the first and second orientation sensing units.

In one embodiment, a first film layer and a second film layer are attached on the flexible display device, the first film layer includes a plurality of first orientation sensing units arranged in parallel in a first direction, and the second film layer includes a plurality of second orientation sensing units arranged in parallel in a second direction;

each of the first and second orientation sensing units is adapted to allow a signal to pass through when not being bent, and is also adapted to cut off transmission of the signal when being bent; and the detecting the action performed by the user to the device includes:

inputting a scanning signal at one end of each of the first and second orientation sensing units, and detecting whether the scanning signal is output at the other end of each of the first and second orientation sensing units to determine whether each of the first and second orientation sensing units is bent; and obtaining a position of the first orientation sensing unit or the second orientation sensing unit of no scanning signal output detected, and thereby determining the position at which bending occurs.

In one embodiment, the method further includes providing a Boolean variable for each first orientation sensing unit to keep a record of bending state to obtain a first Boolean array, and providing a Boolean variable for each second orientation sensing unit to keep a record of bending state to obtain a second Boolean array, wherein each element in the first Boolean array has an index corresponding to a position of one first orientation sensing unit respectively, and each element in the second Boolean array has an index corresponding to a position of one second orientation sensing unit respectively.

In one embodiment, when the first or second orientation sensing unit is bent, value of the corresponding Boolean variable is set to be true, otherwise the value of the corresponding Boolean variable is set to be false; and the method further includes: acquiring a coordinate pair corresponding to one element in the first Boolean array and the other element in the second Boolean array both of which are set to be true, to acquire coordinates of the position at which bending occurs.

In one embodiment, the first direction and the second direction are perpendicular to each other.

In one embodiment, the system function is to enlarge a display font when the action is bending.

In one embodiment, the system function is to lock screen or turn power off when the action is folding the device to make it have an angle less than a preset value; and system function is to unlock screen or turn power on when the action is folding the device to make it have an angle larger than the preset value.

In one embodiment, the system function is to enable taking pictures or videos when the action is edge deforming.

In one embodiment, the system function is to return a system main interface or close a currently active program when the action is to enable the device recovering its shape within a predetermined time after the device being bent.

The above method can transform a deformation action on the flexible display device into an operating instruction for the flexible display device with the deformation characteristics of the flexible display device, to facilitate operations on the device.

According to another aspect of the present disclosure, an operational control method of a flexible display device for controlling the flexible display device is provided, and the method includes:

detecting an action of bending or folding performed by a user to the device; and analyzing a characteristic value of the action, and performing a corresponding system function when the characteristic value of the action satisfies a preset condition.

In one embodiment, a plurality of position sensors are arranged on a screen of the flexible display device, and the plurality of position sensors are adapted to sense distances between each other; and the detecting the action of bending or folding performed by the user to the device includes:

selecting one position sensor from the plurality of position sensors, as a reference sensor;

calculating a variation in a distance between other position sensor and the reference sensor, and taking the position sensor the distance from which to the reference sensor is changed, as a movement sensor;

acquiring position information of the movement sensor; and calculating a position at which bending or folding occurs based on the position information of the movement sensor.

In one embodiment, the method further includes calculating a degree of bending or folding based on the position information of the movement sensor.

In one embodiment, the reference sensor is arranged on a corner point of the screen or a center of the screen.

According to a further aspect of the present disclosure, an operational control method of a flexible display device for controlling the flexible display device including a flexible screen according to a user's action to the device is provided, and the method includes:

detecting a bending action performed by the user to the device; and analyzing a characteristic value of the action, and performing a corresponding system function when the characteristic value of the action satisfies a preset condition.

In one embodiment, an elastic sensing element is arranged on a display surface and/or a back surface of the screen of the flexible display device, and the elastic sensing element is adapted to output a signal corresponding to an amount of a deformation caused by stretching or compressing; and the detecting the bending action performed by the user to the device includes:

detecting a signal output from each elastic sensing element;

determining the screen is bent towards the back surface when the signal from the elastic sensing element on the display surface shows the elastic sensing element is stretched and/or the signal from the elastic sensing element on the back surface shows the elastic sensing element is compressed; and determining the screen is bent towards the display surface when the signal from the elastic sensing element on the display surface shows the elastic sensing element is compressed and/or the signal from the elastic sensing element on the back surface shows the elastic sensing element is stretched.

In one embodiment, the method further includes:

calculating a degree of the screen being bent according to the amount of the deformation caused by the elastic sensing element being stretched or compressed.

In one embodiment, the elastic sensing element is adapted to sense the stretching or compressing in a first direction and in a second direction.

In one embodiment, the elastic sensing element includes a first elastic sensing element adapted to sense the stretching or compressing in the first direction, and a second elastic sensing element adapted to sense the stretching or compressing in the second direction.

In one embodiment, the first direction and the second direction are perpendicular to each other.

In one embodiment, there are multiple elastic sensing elements arranged on the display surface or the back surface of the screen, and the method further includes:

acquiring a position of each elastic sensing element which has been in an elastic deformation, to calculate a position at which bending occurs.

According to still a further aspect of the present disclosure, a bending detection method of a flexible display device for detecting a position at which bending occurs on the flexible display device is provided, wherein a first film layer and a second film layer are arranged on the flexible display device, the first film layer includes a plurality of first orientation sensing units arranged in parallel in a first direction, and the second film layer includes a plurality of second orientation sensing units arranged in parallel in a second direction;

each of the first and second orientation sensing units is adapted to allow a signal to pass through when not being bent, and is also adapted to cut off transmission of the signal when being bent; and said method includes:

inputting a scanning signal at one end of each of the first and second orientation sensing units, and detecting whether the scanning signal is output at the other end of each of the first and second orientation sensing units to determine whether each of the first and second orientation sensing units is bent; and determining a position at which bending occurs based on a position of the bent first orientation sensing unit or the second orientation sensing unit.

In one embodiment, the method further includes providing a Boolean variable for each first orientation sensing unit to keep a record of bending state to obtain a first Boolean array, and providing a Boolean variable for each second orientation sensing unit to keep a record of bending state to obtain a second Boolean array, wherein each element in the first and second Boolean arrays is provided with a corresponding index respectively, the index of each element in the first Boolean array corresponds to a position of one first orientation sensing unit respectively, and the index of each element in the second Boolean array corresponds to a position of one second orientation sensing unit respectively.

In one embodiment, when the first or second orientation sensing unit is bent, value of the corresponding Boolean variable is set to be true, otherwise the value of the corresponding Boolean variable is set to be false; and the method further includes: acquiring a coordinate pair corresponding to one element in the first Boolean array and the other element in the second Boolean array both of which are set to be true, to acquire coordinates of the position at which bending occurs.

In one embodiment, when the first or second orientation sensing unit is bent, the value of the corresponding Boolean variable is set to be false, otherwise value of the corresponding Boolean variable is set to be true; and the method further includes: acquiring a coordinate pair corresponding to one element in the first Boolean array and the other element in the second Boolean array both of which are set to be false, to acquire coordinates of the position at which bending occurs.

In one embodiment, the first direction and the second direction are perpendicular to each other.

The above method can determine which sensing unit has been bent with the characteristic that the flexible sensing unit may cut off transmission of the signal when being bent, thereby detect the position at which bending occurs accurately.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Example One

Figure 1:
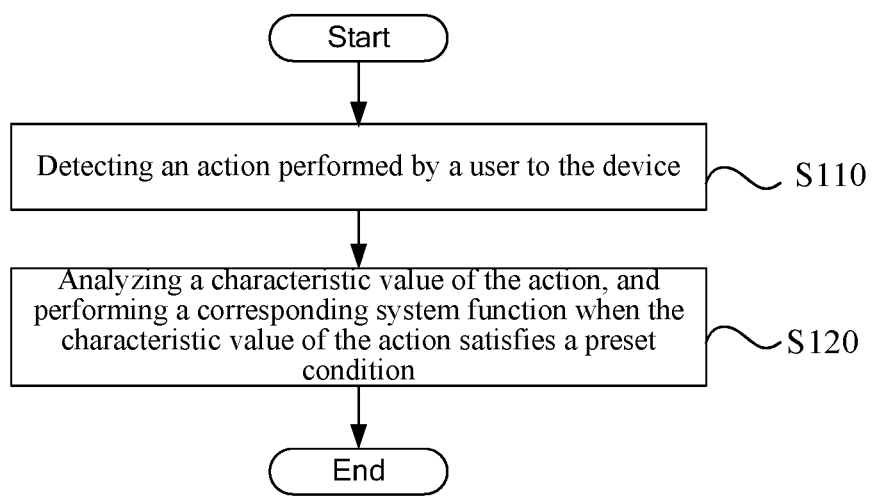
FIG. 1 is a flowchart illustrating an operational control method of a flexible display device according to Example One of the present disclosure.

FIG. 1 is a flowchart illustrating an operational control method of a flexible display device according to Example One of the present disclosure. As shown in the drawing, the method is used to control an action performed by a user to a flexible display device in the flexible display device, including the following steps.

Step S110: detecting an action performed by a user to the device. The action includes one or any combination of bending, folding, edge deforming and shape recovering.

Step S120: analyzing a characteristic value of the action, and performing a corresponding system function when the characteristic value of the action satisfies a preset condition.

Figure 2:
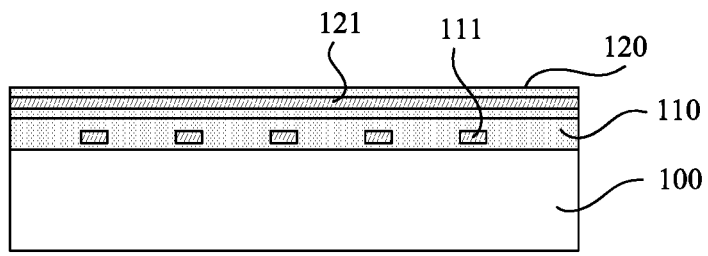
FIG. 2 is a side view showing a first film layer and a second film layer arranged on a flexible display device according to Example One of the present disclosure.
Figure 3:
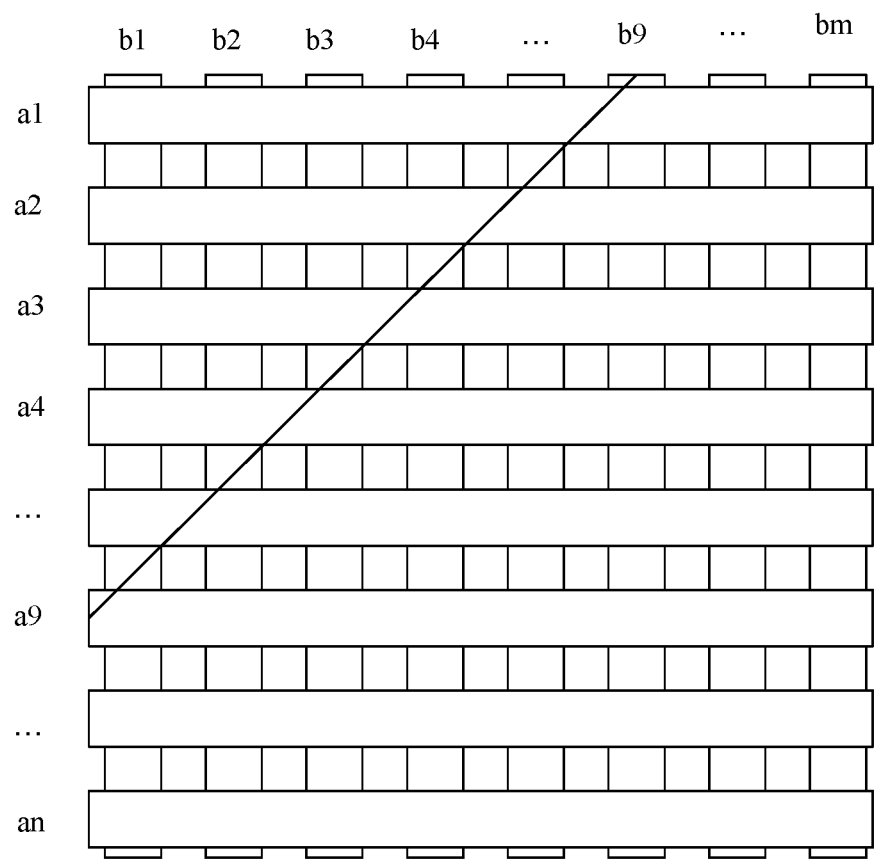
FIG. 3 is a top view showing the first film layer and the second film layer arranged on the flexible display device according to Example One of the present disclosure.

As shown in FIGS. 2 and 3, a first film layer 110 and a second film layer 120 are arranged on the flexible display device 100. The first film layer 110 includes a plurality of first orientation sensing units 111 arranged in parallel in a first direction, and the second film layer 120 includes a plurality of second orientation sensing units 121 arranged in parallel in a second direction. Preferably, the first direction and the second direction are perpendicular to each other. Each of the first and second orientation sensing units is adapted to generate a sensing signal when being bent. In FIG. 2, the first film layer 110 is closer to the flexible display device 100. In other embodiments, the second film layer 120 may be closer to the flexible display device 100. In other word, the extending direction of the first orientation sensing units 111 in the first film layer 110 may be the horizontal direction in the drawing, and the extending direction of the second orientation sensing units 121 in the first film layer 120 may be the direction perpendicular to the paper in the drawing accordingly.

In one exemplary embodiment, the step of detecting the action performed by the user to the device includes step S111: acquiring the sensing signals from the first and second orientation sensing units. The sensing signal is generated by the first orientation sensing unit 111 or the second orientation sensing unit 121 when the first orientation sensing unit 111 or the second orientation sensing unit 121 is bent. The first orientation sensing unit 111 or the second orientation sensing unit 121 may be made of a piezoresistive/piezoelectric material, and when the first orientation sensing unit 111 or the second orientation sensing unit 121 is bent, the resistance thereof may be changed, or the first orientation sensing unit 111 or the second orientation sensing unit 121 may generate current, so that the bending of the first orientation sensing unit 111 or the second orientation sensing unit 121 may be known by detecting the variation in the resistance thereof.

step S112: determining a position at which bending occurs based on the sensing signals from the first and second orientation sensing units.

In another exemplary embodiment, each of the first and second orientation sensing units 111, 121 is adapted to allow a signal to pass through when not being bent, and is also adapted to cut off transmission of the signal when being bent. That is, each of the first and second orientation sensing units 111, 121 cannot generate a signal by itself, but can allow a signal to pass through or cut off transmission of the signal.

The step of detecting the action performed by the user to the device includes:

step S113: inputting a scanning signal at one end of each of the first and second orientation sensing units, and detecting whether the scanning signal is output at the other end of each of the first and second orientation sensing units to determine whether each of the first and second orientation sensing units is bent; and step S114: obtaining a position of the first orientation sensing unit or the second orientation sensing unit of no scanning signal output detected, and thereby determining the position at which bending occurs.

Specifically, each first orientation sensing unit 111 is provided with a corresponding Boolean variable to keep a record of bending state to obtain a first Boolean array, for example, the number of the first orientation sensing units 111 extending in the transverse direction is n. The first Boolean array is a[n], in which n is the index corresponding to the element in the first Boolean array. In this way, the element $a_1$ is used for the first of the first orientation sensing units 111, the element $a_2$ is used for the second of the first orientation sensing units 111, . . . , and the element $a_n$ is used for the nth of the first orientation sensing units 111. Similarly, each second orientation sensing unit 121 is provided with a corresponding Boolean variable to keep a record of bending state to obtain a second Boolean array, for example, the number of the second orientation sensing units 121 extending in the longitudinal direction is m. The second Boolean array is b[m]. In this way, the element $b_1$ is used for the first of the second orientation sensing units 121, the element $b_2$ is used for the second of the second orientation sensing units 121, . . . , and the element $b_m$ is used for the mth of the second orientation sensing units 121. Therefore, the index of one element in the first Boolean array a[n] corresponds to the position of one first orientation sensing unit 111 respectively, and the index of one element in the second Boolean array b[m] corresponds to the position of one second orientation sensing unit 121 respectively.

In this embodiment, when the first or second orientation sensing unit 111, 121 is bent, that is the signal is cut off, value of the corresponding Boolean variable is set to be false, otherwise the value of the corresponding Boolean variable is set to be true. a coordinate pair corresponding to one element in the first Boolean array and the other element in the second Boolean array both of which are set to be true may be acquired to acquire coordinates of the position at which bending occurs.

The details of the calculating process will be described as below.

Definition: the row vectors $a_1, \ldots, a_n$ indicate row sensor signals, the column vectors $b_1, b_{in}$ indicate column sensor signals, in which $a_n$ and $b_{in}$ are Boolean values. $a_n=0$ means the signal of the nth row is cut off, $a_n=1$ means the signal of the nth row is allowed to pass through. When the flexible screen is bent, a few rows of signals may be cut off, which may be expressed as $a_i=0$ in a mathematical description, in which i indicates the raw number of the row where the signal is cut off. $b_m=0$ means the signal of the mth column is cut off, $b_m=1$ means the signal of the mth column is allowed to pass through. When the flexible screen is bent, a few columns of signals may be cut off, which may be expressed as $b_j=0$ in a mathematical description, in which j indicates the column number of the column where the signal is cut off.

1. A position $(a_i, b_j)$ of the flexible screen is bent.

2. The first film layer 110 may be scanned in a order from $a_1$ to $a_n$ sequentially. If the signal passes through $a_1$, $a_2$ is continued to be scanned until $a_n$ is scanned, and then start the cycle all over again. If the signal is cut off in $a_1$, $a_2$ is also continued to be scanned while the cut-off signal in $a_1$ is stored and calculated, until the last cut-off signal in $a_i$ is stored. All the cut-off signals in $a_1 \sim a_i$ are stored and calculated.

3. The second film layer 120 may be scanned in a order from $b_1$ to $b_m$ sequentially. If the signal passes through $b_1$, $b_2$ is continued to be scanned until $b_m$ is scanned, and then start the cycle all over again. If the signal is cut off in $b_1$, $b_2$ is also continued to be scanned while the cut-off signal in $b_1$ is stored and calculated, until the last cut-off signal in $b_i$ is stored. All the cut-off signals in $b_1 \sim b_i$ are stored and calculated.

4. The calculated results of all of the stored sensor signals for $a_1 \sim a_i$ and $b_1 \sim b_i$ of the first film layer 110 and the second film layer 120 are processed together to determine the position at which bending occurs $(a_1, b_a)$.

For example:

1. The position at which bending occurs in the flexible screen is $(a_9, b_9)$.

2. The electrical signal in the first film layer 110 shows: $a_1$ off, $a_2$ off, $a_3$ off, $a_4$ off, $a_5$ off, $a_6$ off, $a_7$ off, $a_8$ off, $a_9$ off, $a_{10}$ on, $a_{11}$ on, $a_{12}$ on, $a_{13}$ on, . . . , and $a_n$ on, and the electrical signal cut off in $a_1 \sim a_9$ may be stored and calculated.

3. The electrical signal in the second film layer 120 shows: $b_1$ off, $b_2$ off, $b_3$ off, $b_4$ off, $b_5$ off, $b_6$ off, $b_7$ off, $b_8$ off, $b_9$ off, $b_{10}$ on, $b_{11}$ on, $b_{12}$ on, $b_{13}$ on, . . . , and $b_m$ on, and the electrical signal cut off in b1]~$b_9$ may be stored and calculated.

4. The calculated results of all of the stored sensor signals for $a_1 \sim a_9$ and $b_1 \sim b_9$ of the first film layer 110 and the second film layer 120 are processed together to determine the position at which bending occurs is an oblique line $(a_9, b_9)$.

Figure 4:
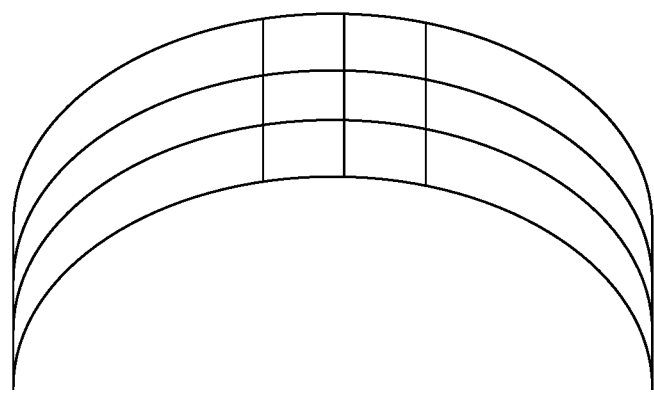
FIG. 4 is a diagram illustrating the first film layer and the second film layer arranged on the flexible display device being bent in transverse direction.

As shown in FIG. 4, when the flexible display device 100 is bent in a transverse direction, all the sensing units in the transverse direction (for example, the first orientation sensing units 111) may be bent, while only few of the sensing units in the longitudinal direction (for example, the second orientation sensing units 121) may be bent. Thus the coordinates of the positions which have been bent may form a few longitudinal lines.

There may be a plurality of actions which the user may perform to the flexible display device, and there may be a plurality of common system functions corresponding to the actions respectively, to solve the problems in the daily operations. The corresponding relations between the actions and the operations may include, but is not limited to the following examples.

The system function is to enlarge a display font when the action is bending.

The system function is to lock screen or turn power off when the action is folding the device to make it have an angle less than a preset value; and system function is to unlock screen or turn power on when the action is folding the device to make it have an angle larger than the preset value.

The system function is to enable taking pictures or videos when the action is edge deforming.

The system function is to return a system main interface or close a currently active program when the action is to enable the device recovering its shape within a predetermined time after the device being bent.

Example Two

Figure 5:
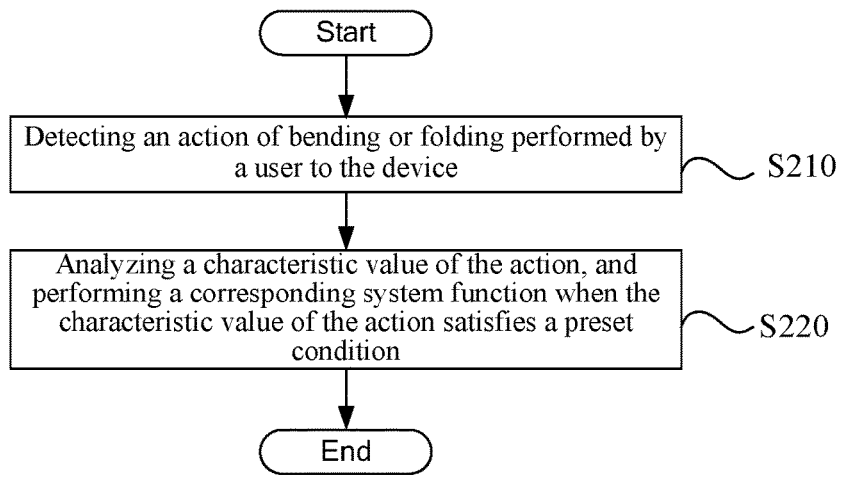
FIG. 5 is a flowchart illustrating an operational control method of a flexible display device according to Example Two of the present disclosure.

As shown in FIG. 5, the processes of the operational control method of the flexible display device in this example is similar to the operational control method of the flexible display device as described above in the Example One, including:

step S210: detecting an action of bending or folding performed by a user to the device; and step S220: analyzing a characteristic value of the action, and performing a corresponding system function when the characteristic value of the action satisfies a preset condition.

Figure 6:
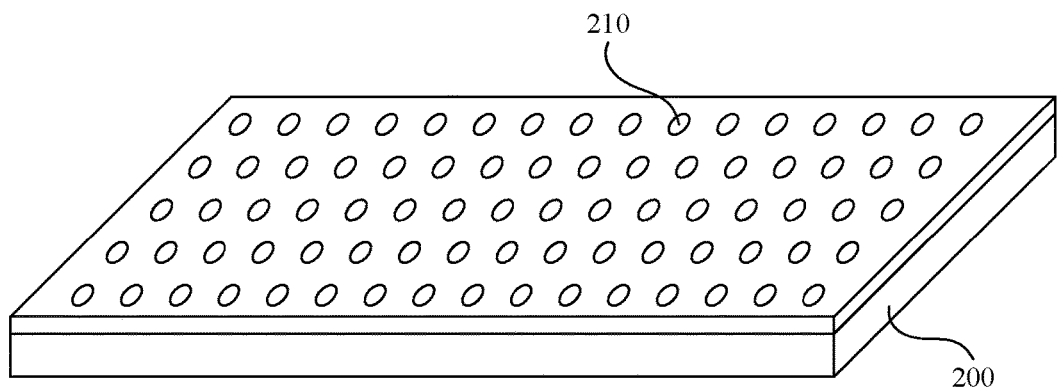
FIG. 6 is a diagram illustrating the position and distribution of the position sensors arranged on a flexible display device according to Example Two of the present disclosure.

In this embodiment, as shown in FIG. 6, a plurality of position sensors 210 are arranged on a screen 200 of the flexible display device. Specifically, the plurality of position sensors 210 are attached on an additional film layer, and the film layer is attached to the screen 200.

The step of detecting the action of bending or folding performed by the user to the device includes the following processes.

Step S211: selecting one position sensor from the plurality of position sensors, as a reference sensor.

Step S212: calculating a variation in a distance between other position sensor and the reference sensor, and taking the position sensor the distance from which to the reference sensor is changed, as a movement sensor. The movement sensor may refer to a position sensor the distance from which to the reference sensor is changed but the position of the sensor may not be changed. When the flexible display device is bent or folded, the position of a part of the flexible display device usually changes relative to the other parts of the flexible display device.

Step S213: acquiring position information of the movement sensor. Specifically, it is to learn which position sensor is taken as the movement sensor.

Step S214: calculating a position at which bending or folding occurs based on the position information of the movement sensor. Each position sensor has a relatively fixed position on the flexible display device, and is given an unique identification. It may be known which parts of the screen are bent or folded by acquiring the identification of the movement sensor.

Specifically, refer to the plan view showing the distribution of the position sensors in FIG. 6, the position sensor 211 at the bottom-left corner of the screen is selected as the reference sensor.

Figure 7:
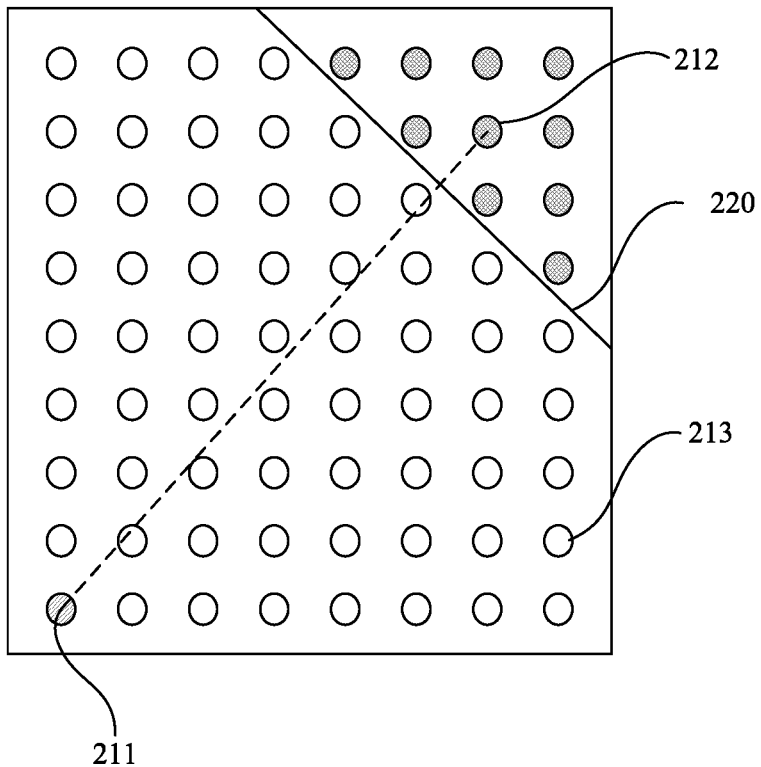
FIG. 7 is a plan view showing the distribution of the position sensors arranged on a flexible display device according to Example Two of the present disclosure.

When the flexible display device 200 is folded along the fold line 220 in FIG. 7, the distance between each position sensor 212 on the area of the upper-right corner of the screen and the reference sensor is changed. The area which has been folded and the position which has been folded (the position of the fold line 220) may be known by calculating and determining the distance.

The distance between each position sensor 213 on the other areas of the screen and the reference sensor is not changed, and the area where such position sensor 213 does not belongs to the area which has been folded.

Further, the degree of bending or folding may be determined by calculating the distance between the movement sensor and the reference sensor. As shown in FIG. 7, when the degree of being folded is slight, there is not a large variation in the distance, while when the degree of being folded is great, there is a large variation in the distance.

Example Three

Figure 8:
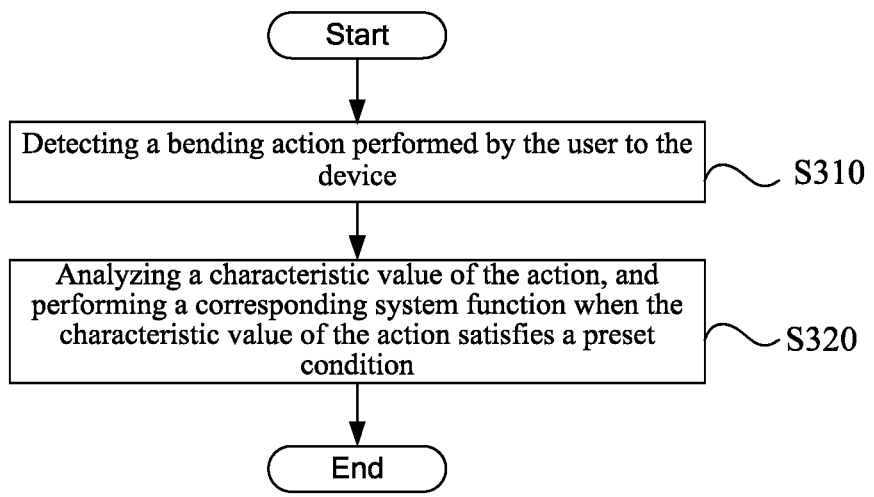
FIG. 8 is a flowchart illustrating an operational control method of a flexible display device according to Example Three of the present disclosure.

As shown in FIG. 8, the processes of the operational control method of the flexible display device in this example is similar to the operational control method of the flexible display device as described above in the Example One, including:

step S310: detecting a bending action performed by the user to the device; and step S320: analyzing a characteristic value of the action, and performing a corresponding system function when the characteristic value of the action satisfies a preset condition.

Figure 9A:
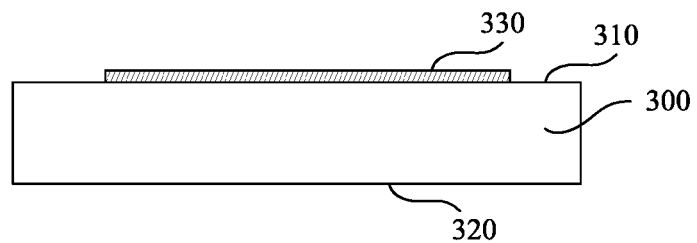
FIGS. 9a-9c are diagrams illustrating a screen of a flexible display device including an elastic sensing element arranged on a display surface of the screen, an elastic sensing element arranged on a back surface of the screen and elastic sensing elements arranged on both of the display surface and back surface of the screen respectively according to Example Three of the present disclosure.
Figure 9B:
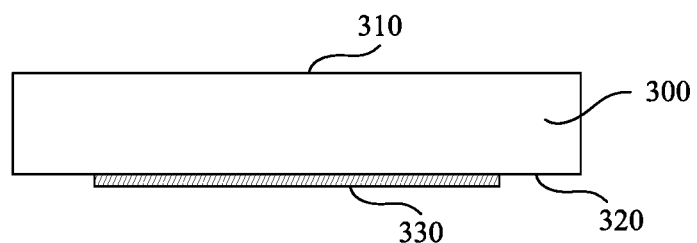
Figure 9C:
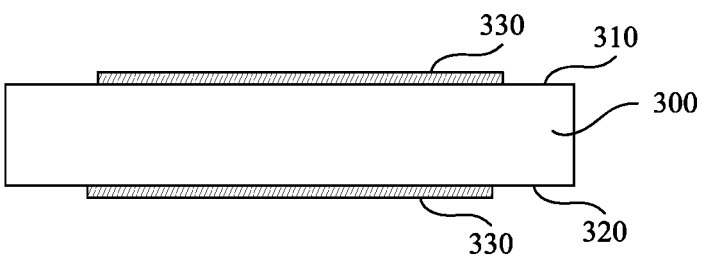

As shown in FIGS. 9*a*-9*c*, FIGS. 9*a*-9*c* are diagrams illustrating a screen including an elastic sensing element arranged on a display surface of the screen, an elastic sensing element arranged on a back surface of the screen and elastic sensing elements arranged on both of the display surface and back surface of the screen respectively. In FIG. 9*a*, the elastic sensing element 330 is arranged on the display surface 310 of the screen 330, and no elastic sensing element is arranged on the back surface 320. In FIG. 9*b*, the elastic sensing element 330 is arranged on the back surface 320, and no elastic sensing element is arranged on the display surface 310. In FIG. 9C, the elastic sensing elements 330 are arranged on both of the display surface 310 and back surface 320 of the screen 300.

The elastic sensing element 330 is adapted to output a signal corresponding to an amount of a deformation caused by stretching or compressing. For example, when the elastic sensing element 330 is stretched, a positive voltage signal may be output, and when the elastic sensing element 330 is compressed, a negative voltage signal may be output.

The step of detecting the bending action performed by the user to the device includes:

step S311: detecting a signal output from each elastic sensing element; and step S212: determining whether the screen has been bent. The details are described as below.

For the configuration as shown in FIG. 9*a*, if the signal from the elastic sensing element 330 on the display surface 310 indicates the elastic sensing element 330 is stretched, for example, a positive voltage signal is detected, it may be determined that the screen 300 is bent towards the back surface 320.

If the signal from the elastic sensing element 330 on the display surface indicates the elastic sensing element 330 is compressed, for example, a negative voltage signal is detected, it may be determined that the screen 300 is bent towards the display surface.

For the configuration as shown in FIG. 9*b*, if the signal from the elastic sensing element 330 on the back surface 320 indicates the elastic sensing element 330 is stretched, for example, a positive voltage signal is detected, it may be determined that the screen 300 is bent towards the display surface 310.

If the signal from the elastic sensing element 330 on the back surface 320 indicates the elastic sensing element 330 is compressed, for example, a negative voltage signal is detected, it may be determined that the screen 300 is bent towards the back surface 320.

For the configuration as shown in FIG. 9*c*, if the signal from the elastic sensing element 330 on the display surface 310 indicates the elastic sensing element 330 is stretched, for example, a positive voltage signal is detected, and at the same time, the signal from the elastic sensing element 330 on the back surface 320 indicates the elastic sensing element 330 is stretched, for example, a negative voltage signal is detected, it may be determined that the screen 300 is bent towards the display surface 320.

If the signal from the elastic sensing element 330 on the display surface indicates the elastic sensing element 330 is compressed, for example, a negative voltage signal is detected, and at the same time, the signal from the elastic sensing element 330 on the back surface 320 indicates the elastic sensing element 330 is stretched, for example, a positive voltage signal is detected, it may be determined that the screen 300 is bent towards the display surface 310.

Further, the degree of the screen being bent may be calculated according to the amount of the deformation caused by the elastic sensing element 330 being stretched or compressed. For example, the detected positive voltage may become larger with the increasing of the amount of the deformation caused by the elastic sensing element 330 being stretched, so the degree of the screen 300 being bent can be determined. When different functions may be implemented based on the degree of the bending, the degree of the bending may correspond to different functions respectively.

Figure 10:
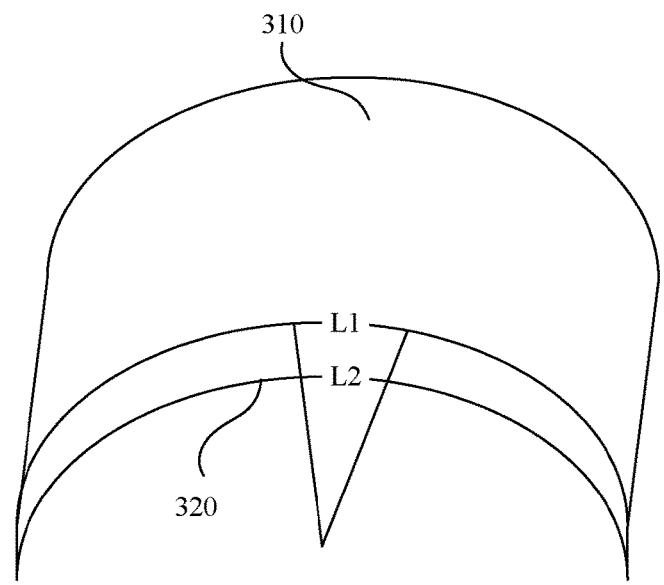
FIG. 10 is a diagram illustrating an amount of a deformation of the display surface and back surface of the screen of the flexible display device according to Example Three of the present disclosure.

As shown in FIG. 10, there are deformations on the display surface 310 and back surface 320 of the screen 300. The amount of the deformation on the back surface 320 is L1, and the amount of the deformation on the display surface 310 is L2. The amount of the deformation of the flexible device is defined as $$\Delta L = \frac{L1 - L2}{L1 + L2},$$

and the degree of the screen being bent may be known according to the $\Delta L$.

In one exemplary embodiment, the elastic sensing element 330 is adapted to sense the stretching or compressing in a first direction and in a second direction. For example, the elastic sensing element 330 is made of an anisotropic material, and the elastic sensing element 330 may produce a voltage variation in the first or second direction when it is bent in the first or second direction. The direction in which the screen is bent may be known by detecting the voltage in the first and the second directions.

In another exemplary embodiment, the elastic sensing element 330 includes a first elastic sensing element adapted to sense the stretching or compressing in the first direction, and a second elastic sensing element adapted to sense the stretching or compressing in the second direction. That is, the bending in two directions is sensed by two elastic sensing elements respectively. Of course, in other embodiments, the bending in two directions may be sensed by a kind of elastic sensing elements arranged in different directions.

In this embodiment, the first direction and the second direction are perpendicular to each other. Specifically, the first direction is the transverse direction, and the second direction is the longitudinal direction.

Figure 11:
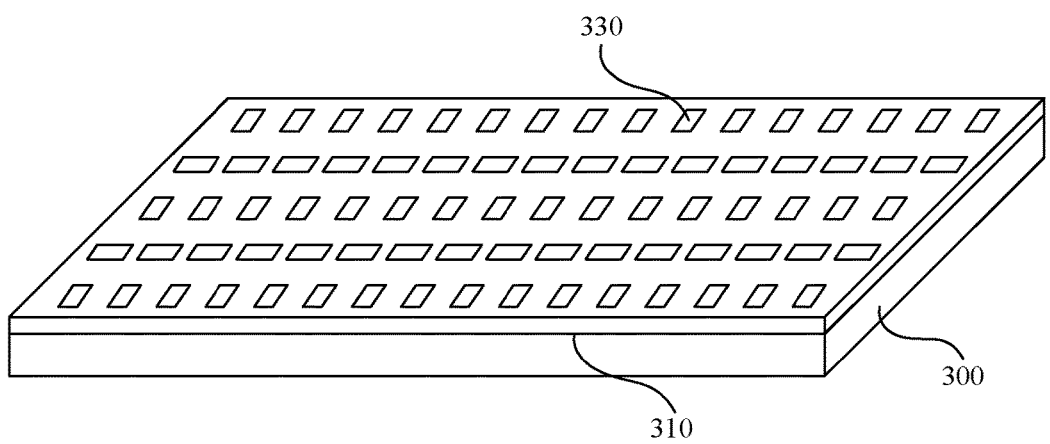
FIG. 11 is a diagram illustrating the distribution of a plurality of sensing elements arranged on the display surface of the screen of the flexible display device according to Example Three of the present disclosure.

In a further exemplary embodiment, there are multiple elastic sensing elements 330 arranged on the display surface or the back surface of the screen. As shown in FIG. 11, the multiple elastic sensing elements 330 are arranged on the display surface 310 of the screen 300. The elastic sensing element 330 may be made of an anisotropic material, and multiple elastic sensing elements 330 may be arranged in two directions perpendicular to each other. The multiple elastic sensing elements 330 are arranged in two directions perpendicular to each other in the embodiment as shown in FIG. 10.

In the above embodiment, the method further includes: acquiring a position of each elastic sensing element which has been in an elastic deformation, to calculate a position at which bending occurs. Each elastic sensing element arranged on the screen 300 is provided with its own identification information and corresponding position information, so the position at which bending occurs may be determined by determining which elastic sensing element 330 has been in an elastic deformation.

Technical features of the above embodiments may be combined arbitrarily. For brief description, not all of the possible combinations of the technical features of the above embodiments are described, but it will be appreciated that these possible combinations belong to the scope of the present disclosure once there is no conflict between the technical features.

The above are embodiments of the disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. An operational control method of a flexible display device for controlling the flexible display device, comprising:
   detecting an action performed by a user to the device, the action including one or any combination of bending, folding, edge deforming and shape recovering; and
   analyzing a characteristic value of the action, and performing a corresponding system function when the characteristic value of the action satisfies a preset condition,
   wherein a first film layer and a second film layer are arranged on the flexible display device, the first film layer includes a plurality of first orientation sensing units arranged in parallel in a first direction, and the second film layer includes a plurality of second orientation sensing units arranged in parallel in a second direction;
   each of the first and second orientation sensing units is adapted to allow a signal to pass through when not being bent, and is also adapted to cut off transmission of the signal when being bent; and
   the detecting the action performed by the user to the device includes:
   inputting a scanning signal at one end of each of the first and second orientation sensing units, and detecting whether the scanning signal is output at the other end of each of the first and second orientation sensing units to determine whether each of the first and second orientation sensing units is bent; and
   obtaining a position of the first orientation sensing unit or the second orientation sensing unit of no scanning signal output detected, and thereby determining the position at which bending occurs.

2. The operational control method of the flexible display device of claim 1, wherein
   each of the first and second orientation sensing units is adapted to generate a sensing signal when being bent; and
   the detecting the action performed by the user to the device includes:
   acquiring the sensing signals from the first and second orientation sensing units; and
   determining a position at which bending occurs based on the sensing signals from the first and second orientation sensing units.

3. The operational control method of the flexible display device of claim 2, wherein the first direction and the second direction are perpendicular to each other.

4. The operational control method of the flexible display device of claim 1, further comprising providing a Boolean variable for each first orientation sensing unit to keep a record of bending state to obtain a first Boolean array, and providing a Boolean variable for each second orientation sensing unit to keep a record of bending state to obtain a second Boolean array, wherein each element in the first Boolean array has an index corresponding to a position of one first orientation sensing unit respectively, and each element in the second Boolean array has an index corresponding to a position of one second orientation sensing unit respectively.

5. The operational control method of the flexible display device of claim 4, wherein when the first or second orientation sensing unit is bent, value of the corresponding Boolean variable is set to be true, otherwise the value of the corresponding Boolean variable is set to be false; and the method further comprises: acquiring a coordinate pair corresponding to one element in the first Boolean array and the other element in the second Boolean array both of which are set to be true, to acquire coordinates of the position at which bending occurs.

6. The operational control method of the flexible display device of claim 1, wherein the system function is to enlarge a display font when the action is bending.

7. The operational control method of the flexible display device of claim 1, wherein the system function is to lock screen or turn power off when the action is folding the device to make it have an angle less than a preset value; and the system function is to unlock screen or turn power on when the action is folding the device to make it have an angle larger than the preset value.

8. The operational control method of the flexible display device of claim 1, wherein the system function is to enable taking pictures or videos when the action is edge deforming.

9. The operational control method of the flexible display device of claim 1, wherein the system function is to return a system main interface or close a currently active program when the action is to enable the device recovering its shape within a predetermined time after the device being bent.

10. The operational control method of the flexible display device of claim 1, wherein a plurality of position sensors are arranged on a screen of the flexible display device, and the plurality of position sensors are adapted to sense distances between each other; and
the detecting the action of bending or folding performed by the user to the device includes:
selecting one position sensor from the plurality of position sensors, as a reference sensor;
calculating a variation in a distance between other position sensor and the reference sensor, and taking the position sensor the distance from which to the reference sensor is changed, as a movement sensor;
acquiring position information of the movement sensor; and
calculating a position at which bending or folding occurs based on the position information of the movement sensor.

11. The operational control method of the flexible display device of claim 10, further comprising calculating a degree of bending or folding based on the position information of the movement sensor.

12. The operational control method of the flexible display device of claim 10, wherein the reference sensor is arranged on a corner point of the screen or a center of the screen.

13. The operational control method of the flexible display device of claim 1, wherein an elastic sensing element is arranged on a display surface and/or a back surface of the screen of the flexible display device, and the elastic sensing element is adapted to output a signal corresponding to an amount of a deformation caused by stretching or compressing; and
the detecting the bending action performed by the user to the device includes:
detecting a signal output from each elastic sensing element;
determining the screen is bent towards the back surface when the signal output from the elastic sensing element on the display surface shows that the elastic sensing element on the display surface is stretched and/or the signal output from the elastic sensing element on the back surface shows that the elastic sensing element on the back surface is compressed; and
determining the screen is bent towards the display surface when the signal output from the elastic sensing element on the display surface shows that the elastic sensing element on the display surface is compressed and/or the signal output from the elastic sensing element on the back surface shows that the elastic sensing element on the back surface is stretched.

14. The operational control method of the flexible display device of claim 13, further comprising:
calculating a degree of the screen being bent according to the amount of the deformation caused by the elastic sensing element being stretched or compressed.

15. The operational control method of the flexible display device of claim 13, wherein the elastic sensing element is adapted to sense the stretching or compressing in a first direction and in a second direction.

16. The operational control method of the flexible display device of claim 13, wherein the elastic sensing element includes a first elastic sensing element adapted to sense the stretching or compressing in a first direction, and a second elastic sensing element adapted to sense the stretching or compressing in a second direction.

17. The operational control method of the flexible display device of claim 16, wherein the first direction and the second direction are perpendicular to each other.

18. The operational control method of the flexible display device of claim 13, wherein there are multiple elastic sensing elements arranged on the display surface or the back surface of the screen, and the method further comprises: acquiring a position of each elastic sensing element which has been in an elastic deformation, to calculate a position at which bending occurs.

19. A bending detection method of a flexible display device for detecting a position at which bending occurs on the flexible display device, wherein a first film layer and a second film layer are arranged on the flexible display device, the first film layer includes a plurality of first orientation sensing units arranged in parallel in a first direction, and the second film layer includes a plurality of second orientation sensing units arranged in parallel in a second direction;
each of the first and second orientation sensing units is adapted to allow a signal to pass through when not being bent, and is also adapted to cut off transmission of the signal when being bent; and
said method comprises:
inputting a scanning signal at one end of each of the first and second orientation sensing units, and detecting whether the scanning signal is output at the other end of each of the first and second orientation sensing units to determine whether the each of the first and second orientation sensing units is bent; and determining a position at which bending occurs based on a position of the bent first or second orientation sensing unit.

20. The bending detection method of the flexible display device of claim 19, further comprising: providing a Boolean variable for each first orientation sensing unit to keep a record of bending state to obtain a first Boolean array, and providing a Boolean variable for each second orientation sensing unit to keep a record of bending state to obtain a second Boolean array, wherein each element in the first and second Boolean arrays is provided with a corresponding index respectively, the index of each element in the first Boolean array corresponds to a position of one first orientation sensing unit respectively, and the index of each element in the second Boolean array corresponds to a position of one second orientation sensing unit respectively.

21. The bending detection method of the flexible display device of claim 20, wherein when the first or second orientation sensing unit is bent, value of the corresponding Boolean variable is set to be true, otherwise the value of the corresponding Boolean variable is set to be false; and the method further includes: acquiring a coordinate pair corresponding to one element in the first Boolean array and the other element in the second Boolean array both of which are set to be true, to acquire coordinates of the position at which bending Occurs.

22. The bending detection method of the flexible display device of claim 20, wherein when the first or second orientation sensing unit is bent, the value of the corresponding Boolean variable is set to be false, otherwise value of the corresponding Boolean variable is set to be true; and the method further includes: acquiring a coordinate pair corresponding to one element in the first Boolean array and the other element in the second Boolean array both of which are set to be false, to acquire coordinates of the position at which bending occurs.

23. The bending detection method of the flexible display device of claim 19, wherein the first direction and the second direction are perpendicular to each other.

* * * * *